US012774546B2

(12) United States Patent
DeYoung

(10) Patent No.: US 12,774,546 B2
(45) Date of Patent: Oct. 27, 2026

(54) APPLIANCE DOSING PUMP WITH AN INTEGRATED RESERVOIR LIQUID LEVEL SENSING FEATURE

(71) Applicant: HTI Technology and Industries, Inc., La Vergne, TN (US)

(72) Inventor: Roger L. DeYoung, Franklin, TN (US)

(73) Assignee: HTI Technology and Industries, Inc., La Vergne, TN (US)

( * ) Notice: Subject to any disclaimer, the term of this patent is extended or adjusted under 35 U.S.C. 154(b) by 193 days.

(21) Appl. No.: 18/785,775

(22) Filed: Jul. 26, 2024

(65) Prior Publication Data

US 2025/0034786 A1 Jan. 30, 2025

Related U.S. Application Data

(60) Provisional application No. 63/515,614, filed on Jul. 26, 2023.

(51) Int. Cl.

| | |
|---|---|
| ***G01F 23/263*** | (2022.01) |
| ***D06F 34/14*** | (2020.01) |
| ***D06F 103/00*** | (2020.01) |
| ***D06F 105/58*** | (2020.01) |
| ***G01F 23/38*** | (2006.01) |

(52) U.S. Cl.

CPC ............ *D06F 34/14* (2020.02); *G01F 23/265* (2013.01); *D06F 2103/00* (2020.02); *D06F 2105/58* (2020.02); *G01F 23/263* (2013.01); *G01F 23/38* (2013.01)

(58) Field of Classification Search

CPC .... D06F 39/022; D06F 34/14; D06F 2103/00; D06F 2105/58; G01F 23/265; G01F 23/263; G01F 23/26; G01F 23/02; G01F 23/38; G01F 23/007; G01F 23/268

USPC .................................. 222/23, 51, 64, 67, 68

See application file for complete search history.

(56) References Cited

U.S. PATENT DOCUMENTS

| | | | | |
|---|---|---|---|---|
| 4,284,210 A * | 8/1981 | Horak | G01F 11/28 222/14 |
| 7,127,943 B1 * | 10/2006 | Griffiths | G01F 23/265 73/304 C |
| 9,333,281 B2 * | 5/2016 | Giezendanner | A61M 1/73 |
| 2022/0187114 A1 * | 6/2022 | Saich | G01F 23/0007 |

* cited by examiner

*Primary Examiner* — David J Walczak

(74) *Attorney, Agent, or Firm* — Emerson, Thomson & Bennett, LLC; Roger D. Emerson; Allison V. Trimble

(57) ABSTRACT

An appliance dosing pump with an integrated reservoir liquid level sensing feature includes a dosing pump head, a capacitive sensor, a motor housing, and a liquid reservoir. The dosing pump head has a vertical tube, an inlet port, and an outlet port. The capacitive sensor may include a plurality of sensing pads, and the liquid reservoir may have an outlet port. Together, the liquid reservoir outlet port and dosing pump head inlet port may define a fluid passage, which fluid passage may include a plurality of check valves therein.

15 Claims, 19 Drawing Sheets

APPLIANCE DOSING PUMP WITH AN INTEGRATED RESERVOIR LIQUID LEVEL SENSING FEATURE

I. BACKGROUND

A. Technical Field

The present subject matter is directed to apparatuses and methods regarding laundry appliances. More particularly, the invention pertains to the field of liquid reservoirs and dispensing pumps.

B. Description of Related Art

Laundry appliances, such as clothes washing machines, are often equipped with liquid reservoirs and dispensing pumps, also known as dosing pumps, for the storage and dispensing of liquid detergents, liquid fabric softeners, liquid bleach, and other concentrated liquids used in the cleaning of clothing fabrics. The primary benefits of the reservoir and dosing pump are the bulk storage of these liquids within the washing machine and the precise dispensing of a concentrated liquid for a given size load of laundry.

The controller of such an appliance is programmed with user control inputs, to dispense exact amounts of each concentrated liquid, as required by the program options selected by the user. The appliance may be equipped with multiple reservoirs and dosing pumps. Often, these reservoirs are built into a pull-out drawer on the front of the appliance, which, when pulled-out, provides access to a liquid filler cap or similar filler feature. The reservoirs are sized such that a full reservoir will provide many washing cycles before refilling is needed.

Significant design challenges exist with the sensing of the fluid level within the reservoir as the fluid is consumed, as well as with the connection of a sliding drawer-like reservoir to the inlet side of the dosing pump. Due to the stationary mounting characteristics of the dosing pump and the stationary position of the washing tub, the fluid connection of the reservoir to the pump inlet must be either flexible or have a fluid passage disconnecting feature.

A flexible passage creates complications for users who wish to remove the reservoir for cleaning purposes, and a fluid passage disconnecting feature creates complications for managing liquids remaining in the reservoir and pump at the time the reservoir is removed because removal of the reservoir will result in fluid spillage. Further, it is known that dosing pumps will lose prime when disconnected from the reservoir, and therefore, the initial liquid dose, after reconnection, will not be precise because a pocket of air will be trapped between the reservoir connection port and the pump inlet port.

A liquid pump is considered primed when the liquid media that it is pumping has completely filled the pump's passages and chambers. A liquid pump that has lost prime will have a significant amount of air within the passages and chambers of the pump. Air, being an expandable-compressible gas, expands and contracts with each stroke of the pump and causes inefficient and imprecise fluid flow with each suction and compression stroke of the pump. Whereas fluid, being a non-compressible media, is efficient because each suction or compression stroke of the pump provides an efficient and precise flow of the liquid media.

Typically, a liquid pump that has lost prime will require considerable run-time in order to purge the passages and chambers of air in order to regain full prime. In the case of dosing pumps, an accurate flow rate is critical for its application. For liquid level detection, the sliding and removeable reservoir drawer features require that electrical type sensors be disconnected prior to removing the drawer. Conceivably, it is possible to have an electrical connection at the rear of the drawer to engage the level sensor's lead wire terminals, however, it is anticipated that such a connection would be prone to wear and contamination, and thus the connection would not be reliable.

II. SUMMARY

The described invention addresses these aforementioned needs by providing an appliance dosing pump with an integrated reservoir liquid level sensing feature on the stationary inlet side of the pump, to sense fluid level within the reservoir, maintain prime when a reservoir is disconnected, eliminate any electrical disconnection, and have a removable reservoir without liquid spillage after removal.

In accordance with an exemplary embodiment of the invention, a dosing pump assembly includes a dosing pump head having an inlet port connected to a liquid reservoir, an outlet port for dispensing a predetermined dose of liquid from the reservoir, and a fluid passage between the inlet and outlet ports. A vertical tube is fluidly connected to the fluid passage and configured to indicate liquid level of the reservoir. A sensor array is vertically affixed to the vertical tube, the sensor array comprising a plurality of sensors at a respective plurality of sensing positions along the vertical tube indicative of liquid level of the reservoir.

In accordance with another exemplary embodiment of the invention, the vertical tube is mounted parallel to a vertical height of the reservoir such that a level of liquid in the vertical tube corresponds to the liquid level of the reservoir. The vertical tube also includes a vent cap having a vent hole to equalize pressure to atmosphere within the vertical tube.

In accordance with a further exemplary embodiment of the invention, the sensor array includes a capacitive sensor vertically affixed to the vertical tube, wherein the plurality of sensors of the capacitive sensor comprises a plurality of sensing pads at a respective plurality of sensing positions along the vertical tube indicative of liquid level of the reservoir. The capacitive sensor is constructed from a flexible printed circuit disposed on an exterior of the vertical tube. The sensing pads include pairs of sensing pads configured on opposing sides of the vertical tube. The capacitive sensor includes five (5) pairs of sensing pads, disposed in locations vertically on the vertical tube which correspond to liquid sensing positions in the vertical tube of full, three-fourths (¾) full, half (½) full, one-fourth (¼) full, and empty. The capacitive sensor also includes an interface for communicating sensor output indicative of the liquid level of the reservoir to a display screen.

In accordance with an additional exemplary embodiment of the invention, the sensor array includes a plurality of reed switches that turn on or off in response to a position of a floating magnet which floats atop liquid in the vertical tube and thereby raises or lowers with the changing liquid level in the vertical tube. An intermediate liquid level sensing chamber encloses an electrical conducting structure for supporting the plurality of reed switches and an interface to an electrical controller. The dosing pump head is connected to a motor within a motor housing for pumping liquid from the reservoir through the fluid channel to the outlet port.

In accordance with yet another an exemplary embodiment of the invention, the inlet port comprises an inlet port check valve that matingly connects to a reservoir check valve on the reservoir. The fluid passage is restricted from backflow and spillage by the check valves when the liquid reservoir is removed from the inlet port, thereby retaining liquid within the dosing pump in a primed condition. One or both of the inlet port check valve and the reservoir check valve includes an O-ring seal. One or both of the inlet port check valve and the reservoir check valve includes a check valve spring for biasing the check valve into engagement with the respective other check valve. The check valves are positioned at a lowest point of the reservoir to allow the vertical tube to sense a full vertical range of liquid level of the reservoir.

The dosing pump of claim 1, wherein Other benefits and advantages of this invention will become apparent to those skilled in the art to which it pertains upon reading and understanding of the following detailed specification.

III. BRIEF DESCRIPTION OF THE DRAWINGS

The disclosed appliance dosing pump may take physical form in certain parts and arrangement of parts, embodiments of which will be described in detail in this specification and illustrated in the accompanying drawings which form a part hereof. The invention may be better understood by reference to these drawings in conjunction with the detailed description.

IV. DETAILED DESCRIPTION

Figure 1:
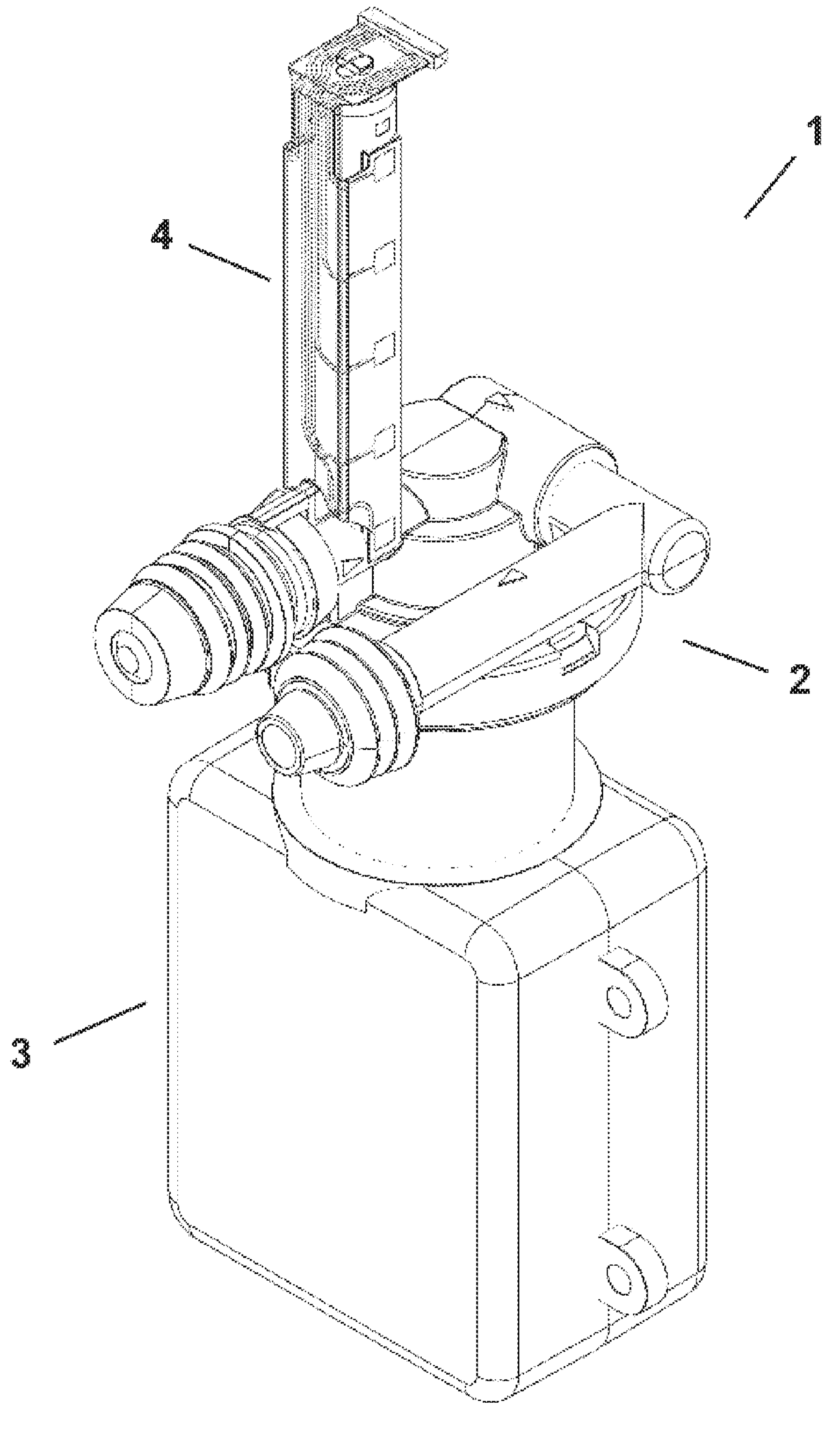
FIG. 1 is a perspective view of a dosing pump with a reservoir liquid level sensor in accordance with an exemplary embodiment.

Referring now to the drawings wherein the showings are for purposes of illustrating embodiments of the article only and not for purposes of limiting the same, and wherein like reference numerals are understood to refer to like components, FIG. 1 shows a dosing pump 1 according to some embodiments of the present subject matter. The dosing pump 1 may include a dosing pump head 2, a capacitive sensor 4, and a motor 3 within a motor housing for pumping liquid.

Figure 2:
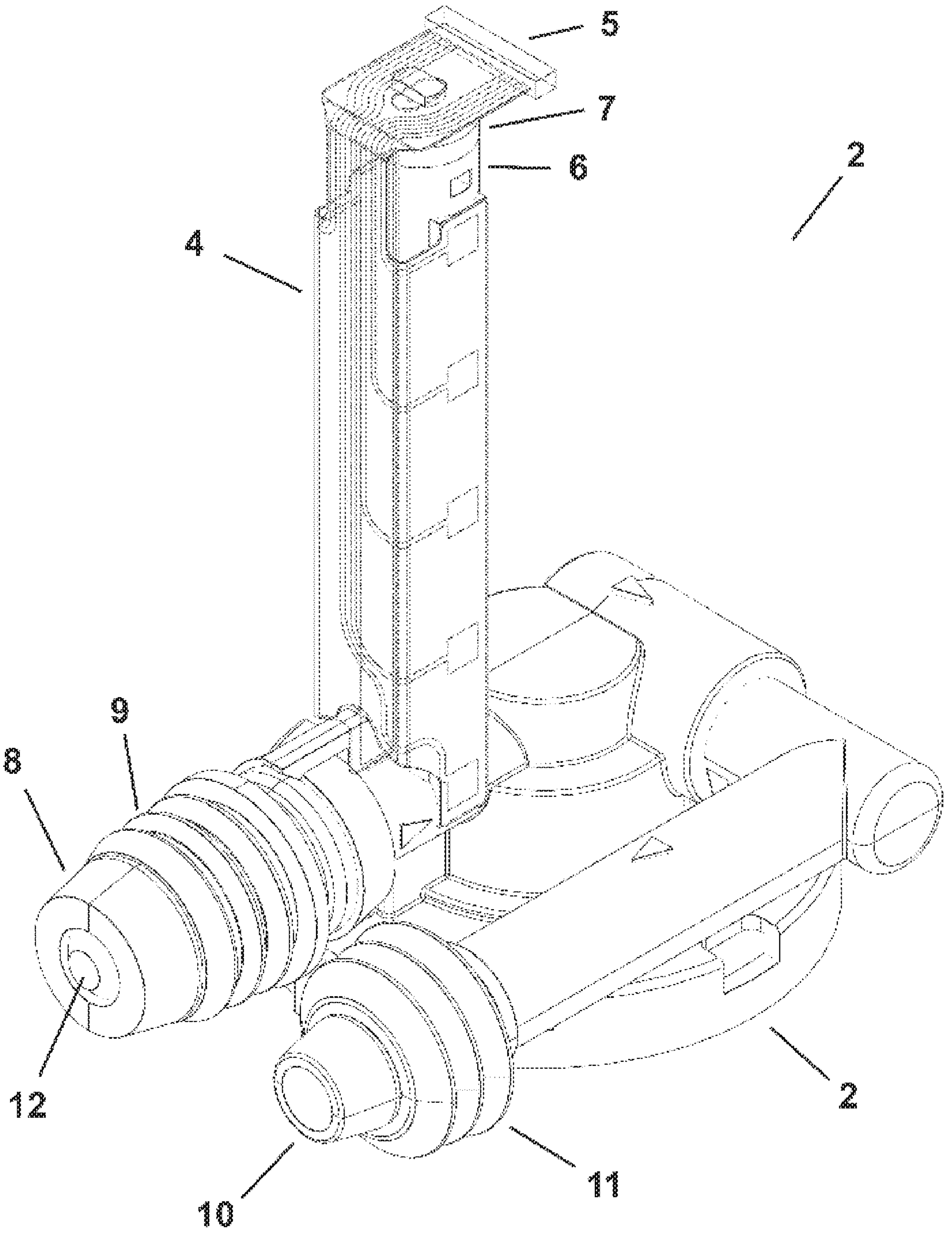
FIG. 2 is a perspective view of a dosing pump head with a reservoir liquid level sensor in accordance with an exemplary embodiment.
Figure 3:
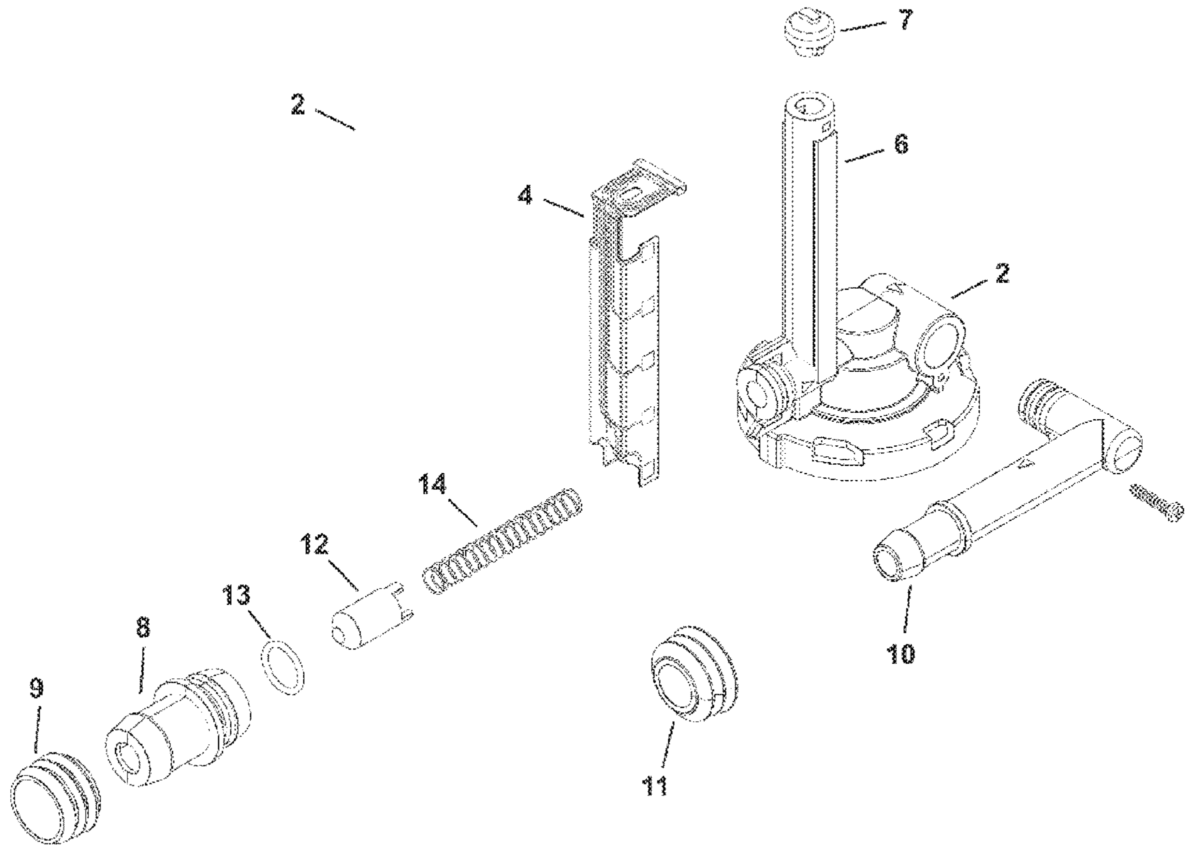
FIG. 3 is an exploded view of a dosing pump head with a reservoir liquid level sensor in accordance with an exemplary embodiment.
Figure 4:
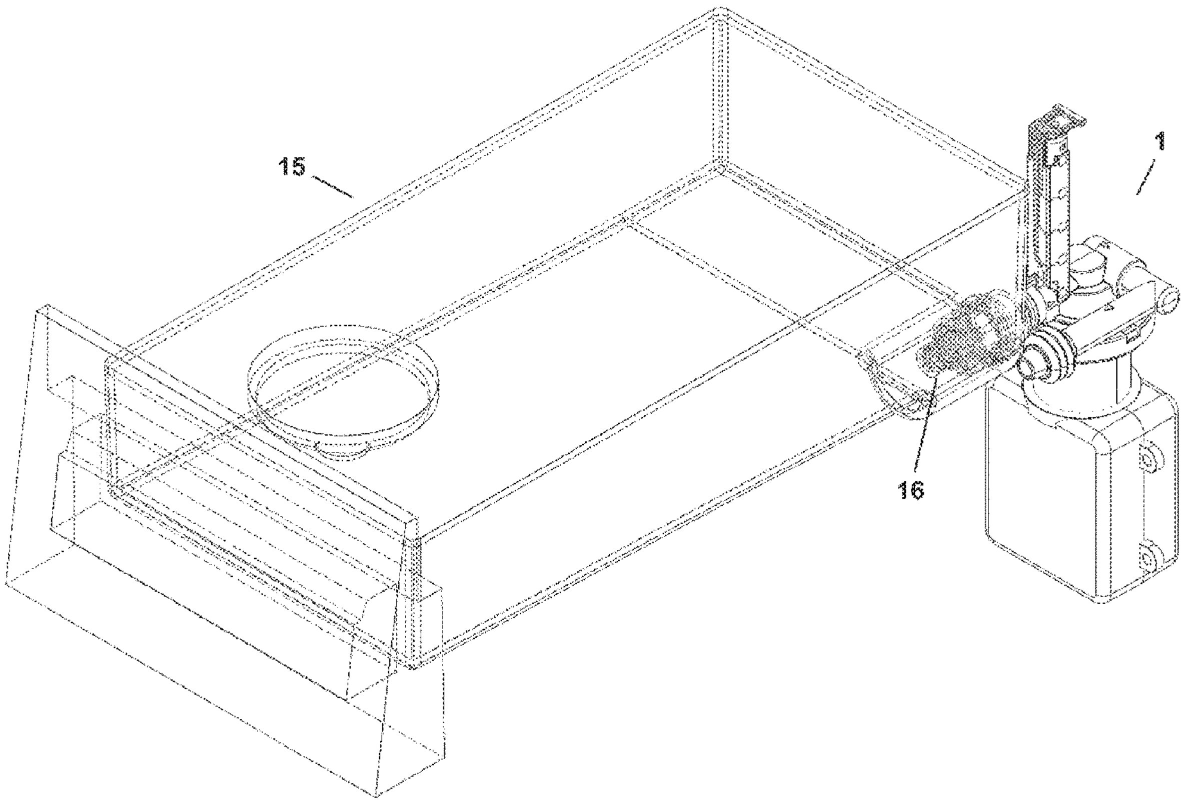
FIG. 4 is a front perspective view of a reservoir connected to a dosing pump with a liquid level sensor in accordance with an exemplary embodiment.
Figure 5:
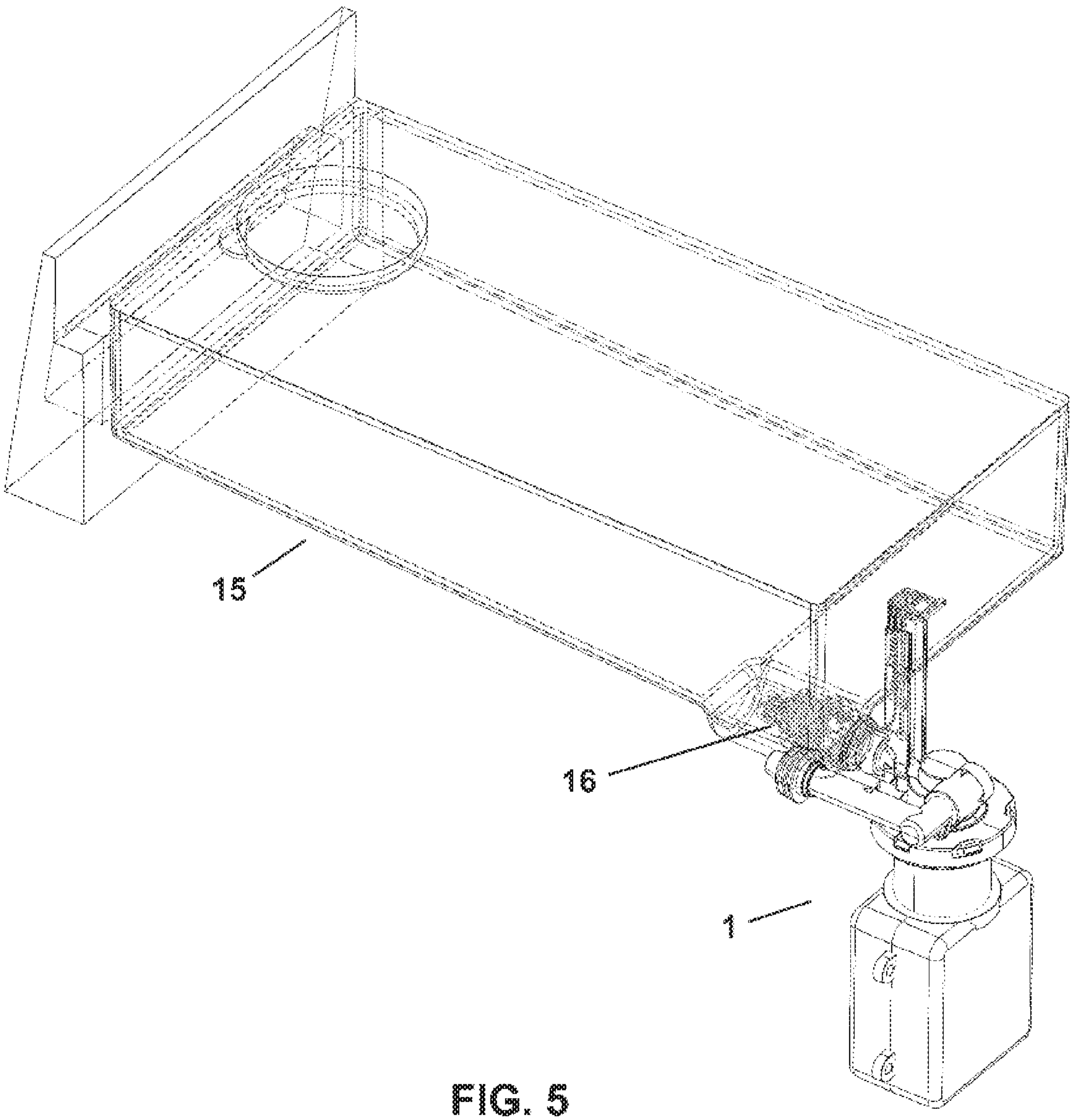
FIG. 5 is a rear perspective view of a reservoir connected to a dosing pump with a liquid level sensor in accordance with an exemplary embodiment.
Figure 6:
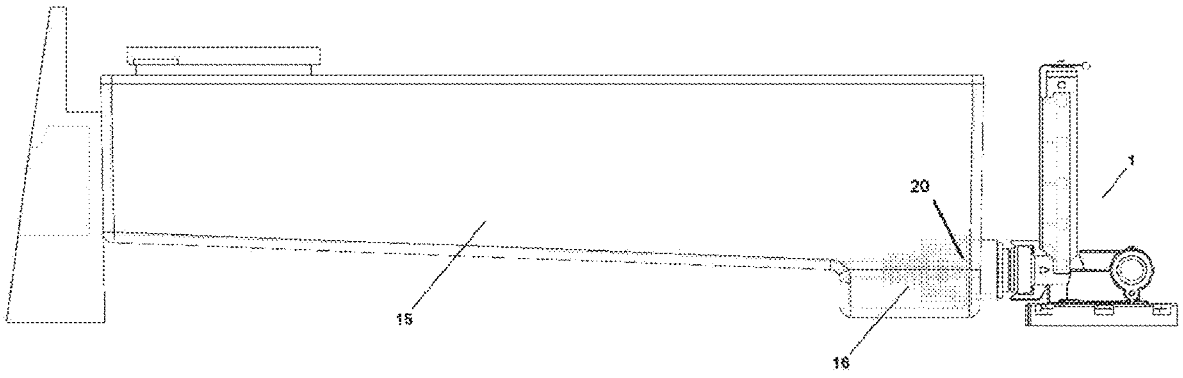
FIG. 6 is a side view of a reservoir connected to a dosing pump with a liquid level sensor in accordance with an exemplary embodiment.
Figure 7:
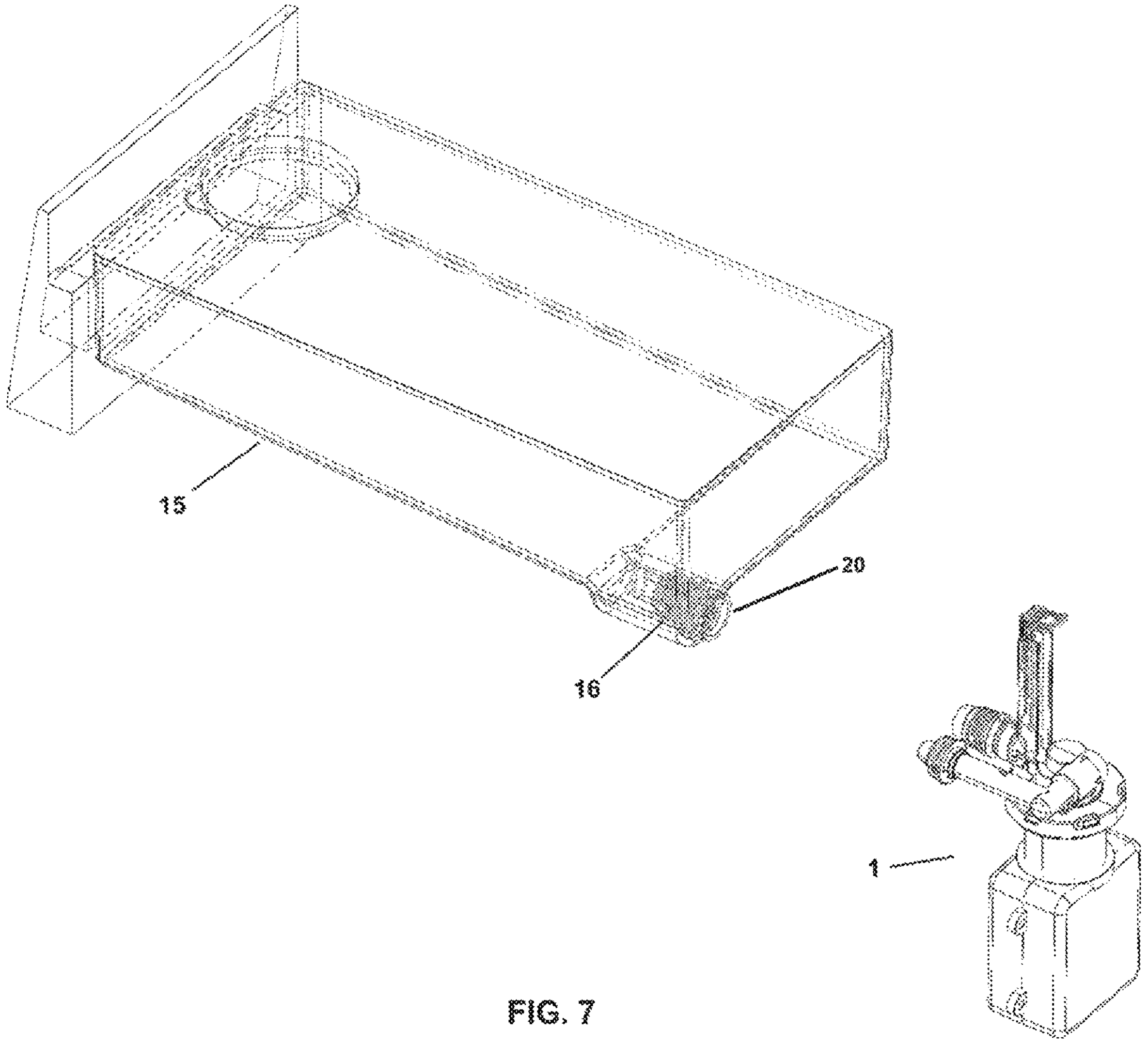
FIG. 7 is a rear perspective view of a reservoir disconnected from a dosing pump with a liquid level sensor in accordance with an exemplary embodiment.
Figure 8:
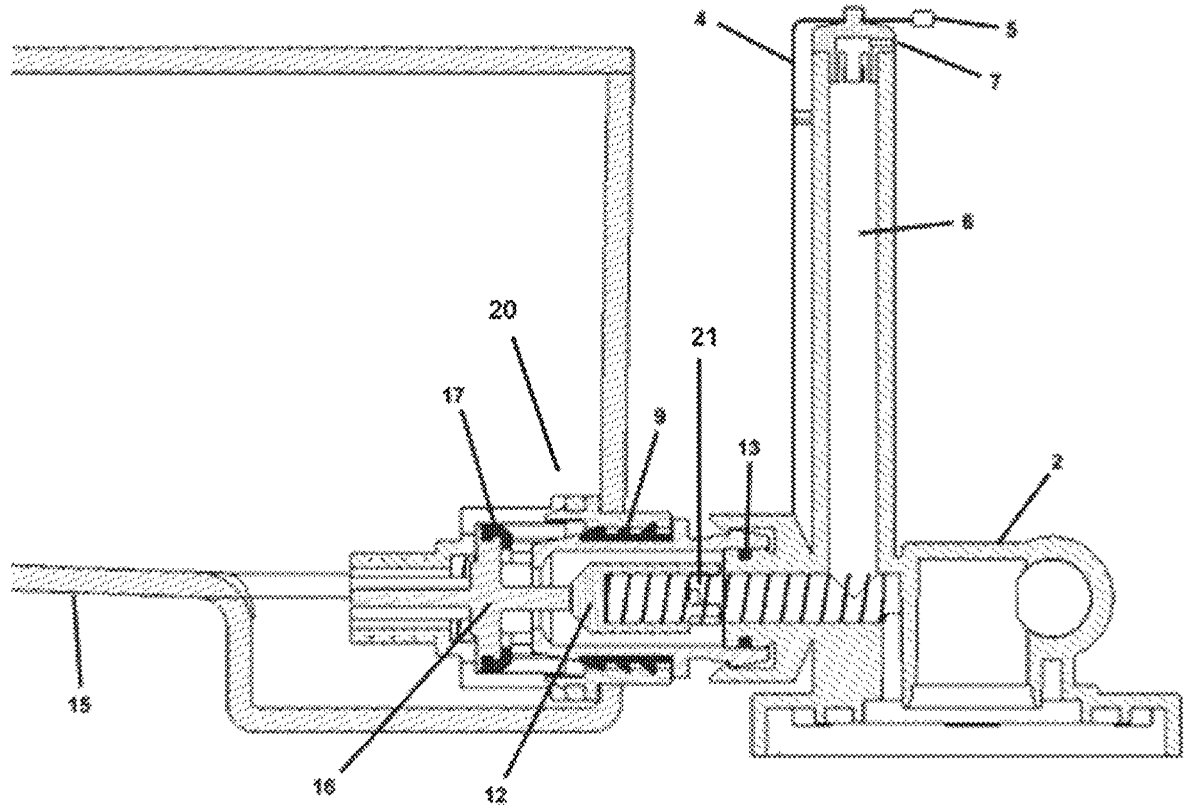
FIG. 8 is a section view of a reservoir connected to a dosing pump with a liquid level sensor in accordance with an exemplary embodiment.
Figure 9:
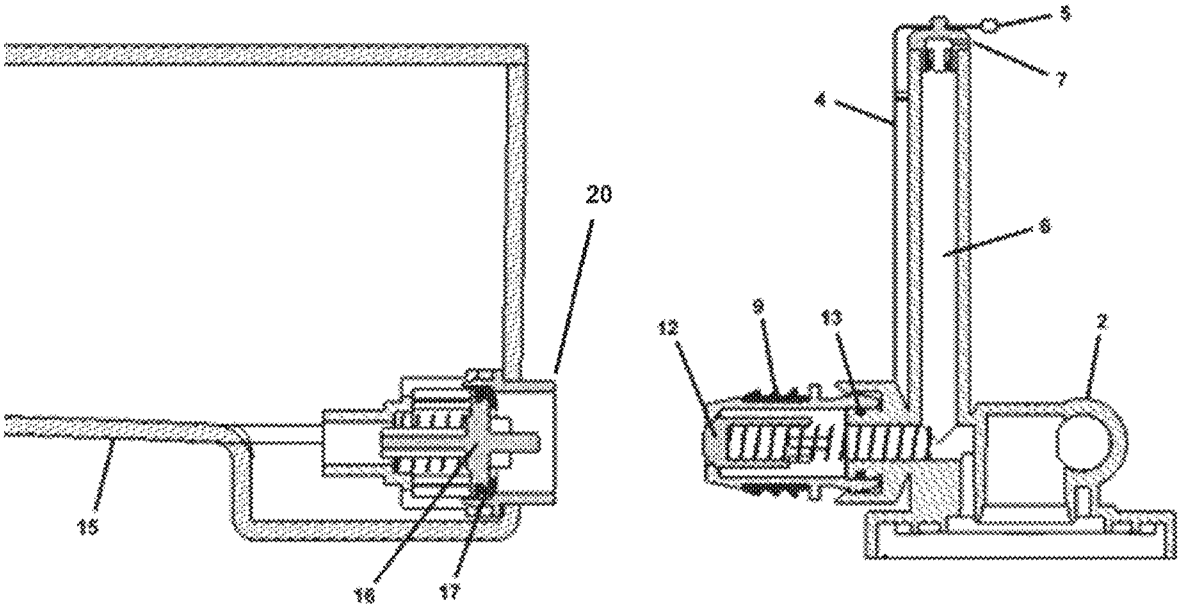
FIG. 9 is a section view of a reservoir disconnected from a dosing pump with a liquid level sensor in accordance with an exemplary embodiment.

With reference now to FIGS. 2 and 3, the dosing pump head 2 may include a vertical sensor tube 6, a vent cap 7 disposed atop the tube 6, an inlet port 8, and an outlet port 10. The inlet and outlet ports may each have a seal (inlet port seal 9, outlet port seal 11).

Figure 10:
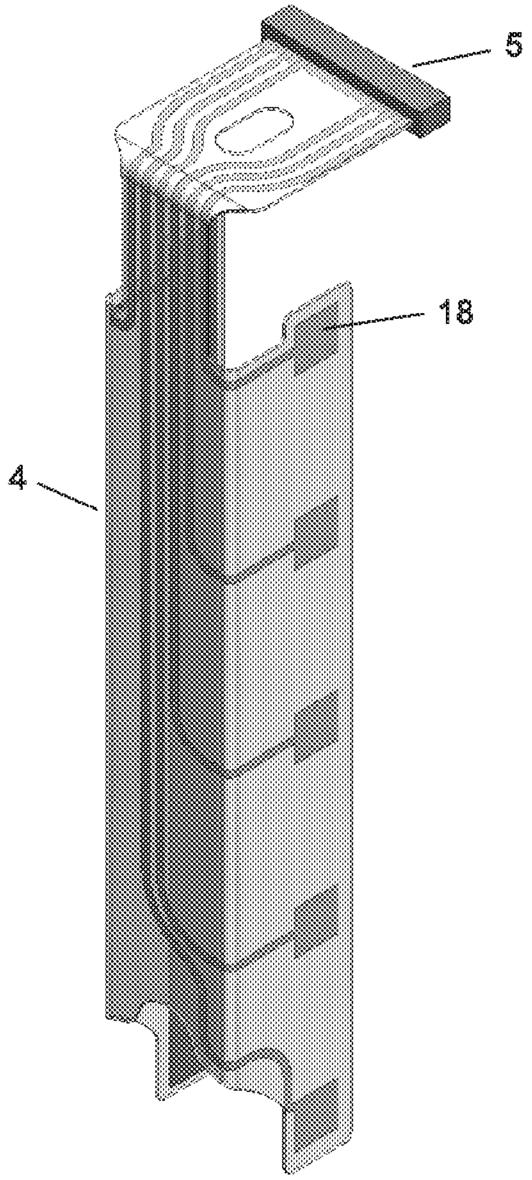
FIG. 10 is a perspective view of a capacitive flexible printed circuit sensor with a connector in accordance with an exemplary embodiment.
Figure 11:
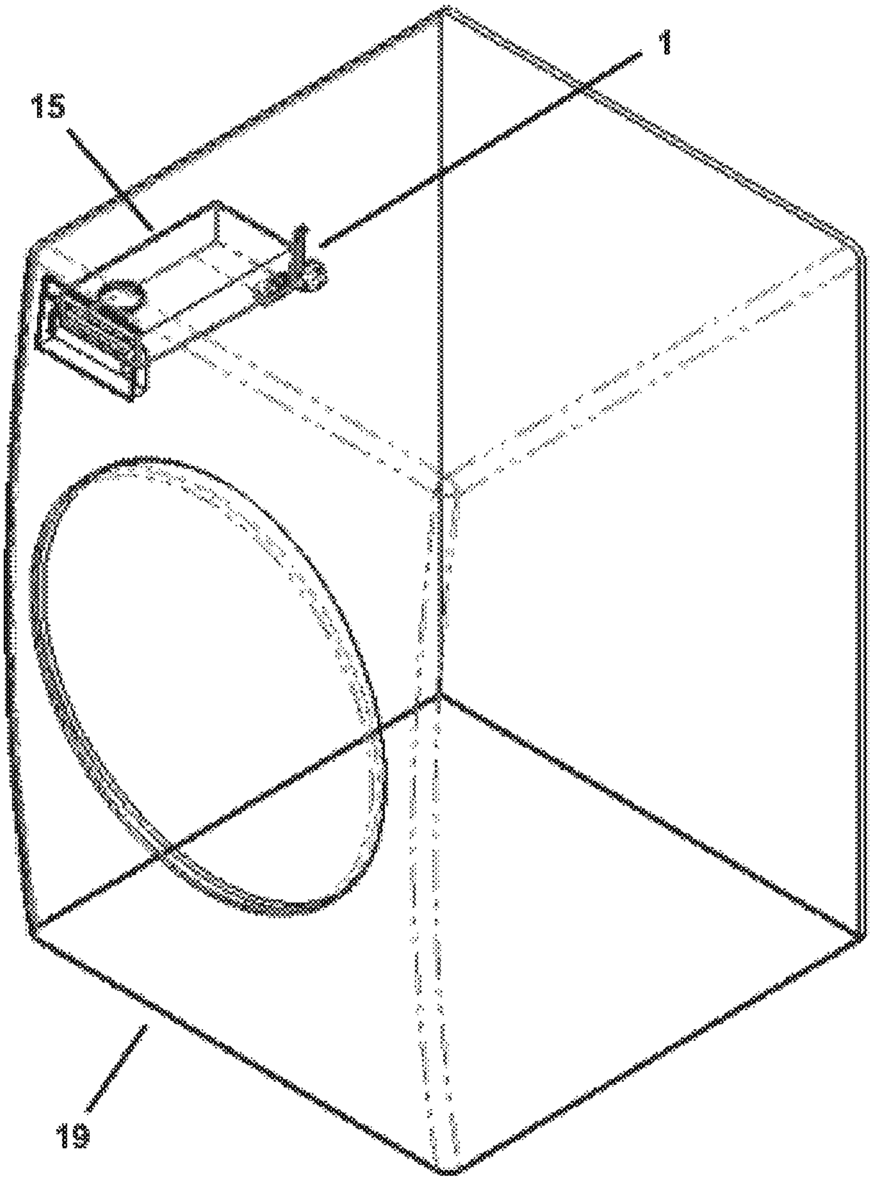
FIG. 11 is a front perspective view of a washing machine appliance with a sliding reservoir connected to a dosing pump with a liquid level sensor in accordance with an exemplary embodiment.

With reference to FIGS. 2 and 10, the capacitive sensor 4 may be a sensor array including a plurality of sensing pads 18 and a printed circuit connector 5. The capacitive sensor 4 may be constructed from a flexible or rigid printed circuit and be disposed on the vertical sensor tube 6. The capacitive sensor 4 may be affixed to the vertical sensor tube 6 using any adhesive chosen according to sound engineering judgment. In a particular embodiment, five pairs of sensing pads 18 may be disposed in locations vertically on the capacitive sensor 4 which correspond to liquid fill positions in the vertical sensor tube 6 of full, three-fourths full, half full, one-fourth full, and empty. The capacitive sensor 4 may contain fewer or a greater number of sensing pads 18 which will correlate to the number of sensing positions.

With reference to FIGS. 3, 4, 5, 6, 7, 8, 9, and 11, the dosing pump 1 may be assembled to include a liquid reservoir 15 from which liquid is pumped via the motor 3. The liquid reservoir 15 may include an outlet port 20, a check valve 16, and a check valve seal 17. The dosing pump head 2 may include an inlet port check valve 12, an inlet port O-ring seal 13, and an inlet port check valve spring 14. Together, the liquid reservoir outlet port 20 and dosing pump head inlet port 8 may define a fluid passage 21 including a plurality of check valves. The fluid passage 21 can include the dosing pump inlet port and reservoir check valves 12, 16 which may be disposed therein. The liquid reservoir 15 may be a drawer-like shape and construction, but the liquid reservoir 15 may be of any shape and construction chosen according to sound engineering judgment. The dosing pump head 2 is connected to the motor 3 within the motor housing for pumping liquid from the reservoir 15 through the fluid channel 21 to the outlet port 20.

In describing a particular embodiment depicted in FIGS. 1-13, the dosing pump 1 described herein may incorporate a vented vertical tube 6 feature on the inlet side of the dosing pump 1 upon which a capacitive sensor 4 may be affixed with an adhesive. The vertical tube 6 may equal, or slightly exceed, the high and low fluid levels of an accompanying reservoir 15. When liquid is present within the reservoir 15, liquid will also seek the same level within the vertical tube 6. The vertical tube 6 is preferably mounted parallel to the vertical height of the reservoir 15 such that a level of liquid in the vertical tube 6 corresponds to the liquid level of the reservoir 15. The vent cap 7 of the vertical tube 6 has a vent hole (e.g., FIG. 8) to equalize pressure to atmosphere within the vertical tube 6.

Figure 12:
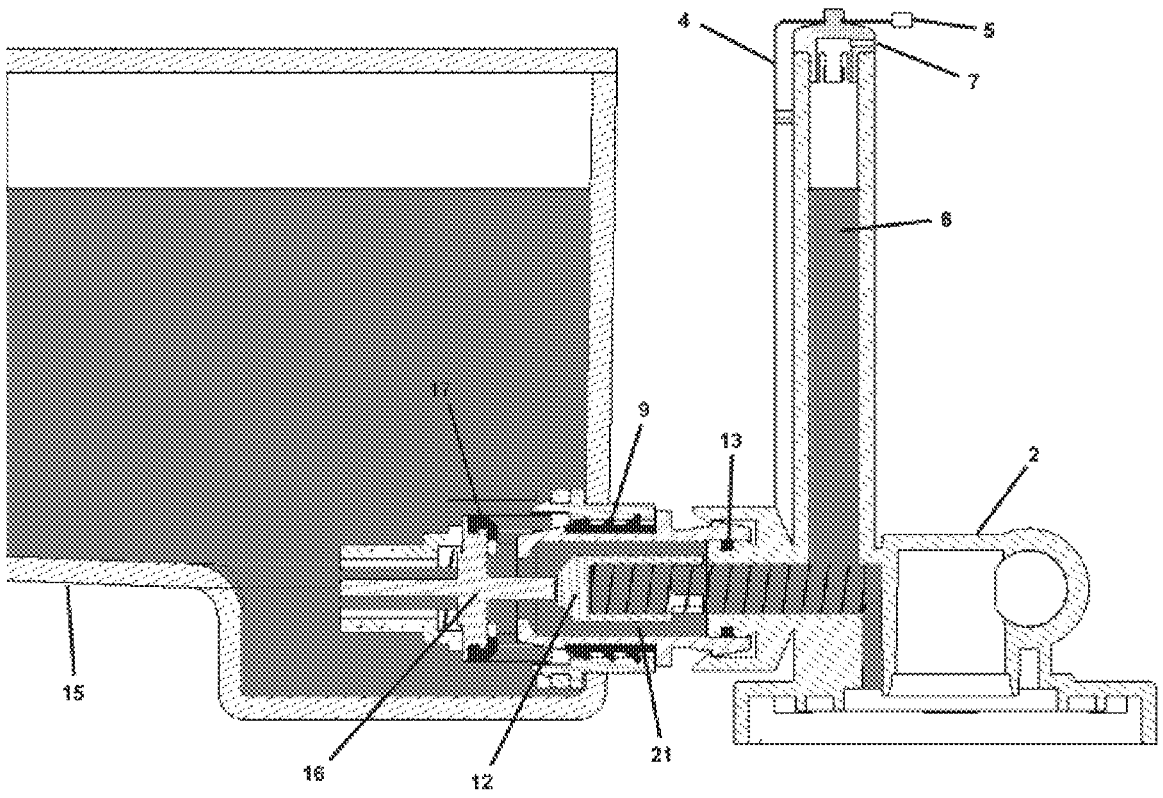
FIG. 12 is a view of FIG. 8, additionally showing water level between a reservoir and a dosing pump in accordance with an exemplary embodiment.
Figure 13:
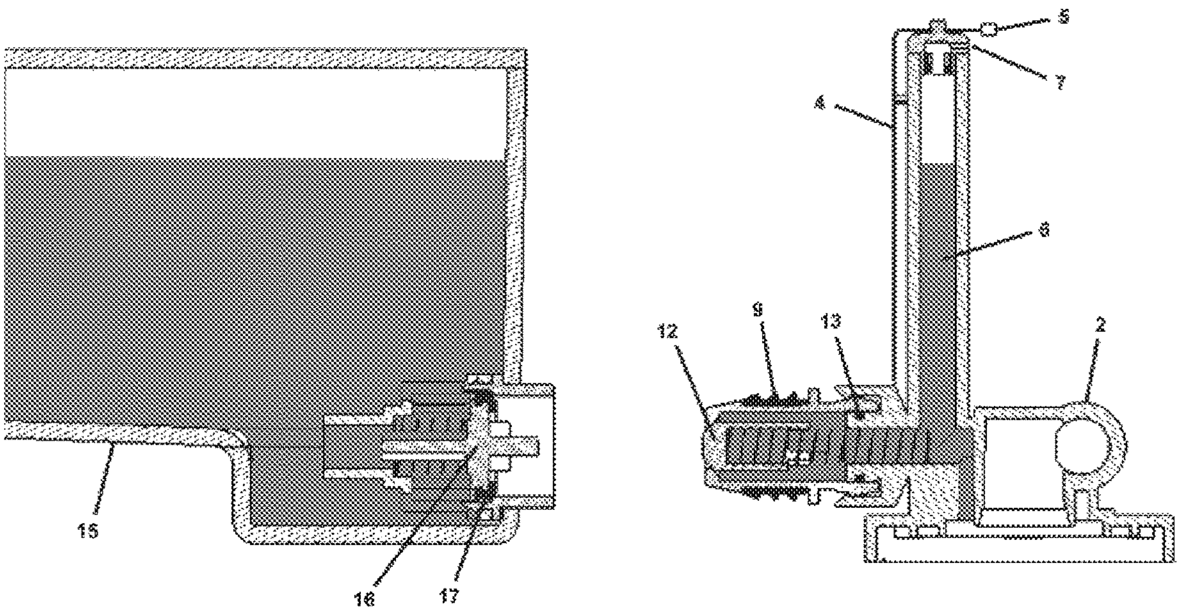
FIG. 13 is a view of FIG. 9, additionally showing water level between a reservoir and a dosing pump in accordance with an exemplary embodiment.
Figure 14:
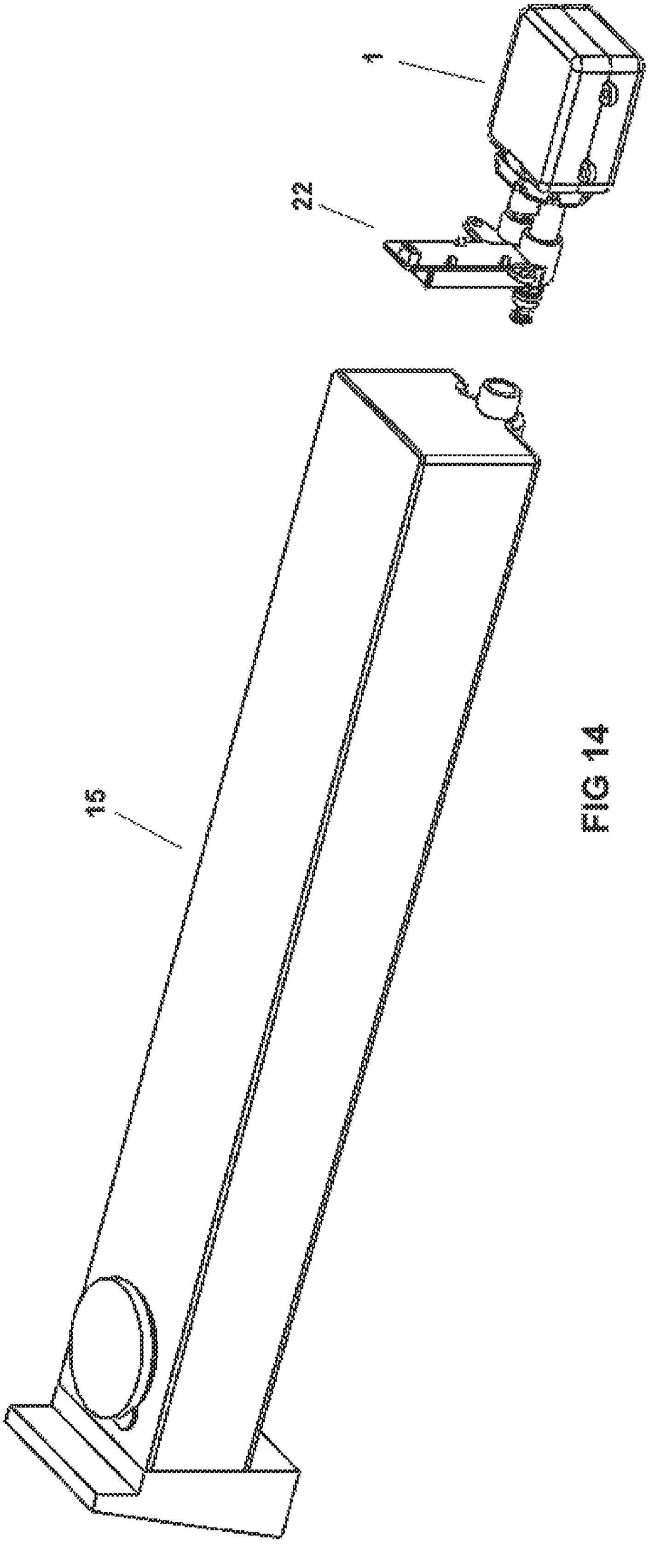
FIG. 14 is a rear perspective view of a reservoir connected to a dosing pump with an intermediate liquid level sensing chamber utilizing a rigid capacitive sensing printed circuit board in accordance with an exemplary embodiment.

As illustrated in FIGS. 12 and 13, fluid that enters the connected fluid passage 21 will fill the pump's passages and chambers and the vertical tube 6. Atmospheric pressure, acting upon the liquid in the reservoir will cause the liquid in the vertical tube 6 to reach an equal level with the liquid in the reservoir 15. The vent hole in the vent cap 7 at the top of the vertical tube 6 eliminates negative and positive pressure that would naturally happen with the rise and fall of the liquid within the vertical tube 6. Upon disconnection and reconnection of the dosing pump 1, any pockets of air that might enter the check vales 12, 16 will flow upwards into the vertical tube 6 to and equalize pressure via the vent cap 7, thereby maintaining prime for the dosing pump 1. The check valves 12, 16 are intentionally positioned at the lowest point of the reservoir 15. This allows for the vertical tube 6 to have sensing of the full vertical range of the reservoir 15.

As illustrated in FIG. 10, the capacitive sensor 4 may have two or more printed sensing pads 18 along the sides of the vertical sides of the tube 6. The capacitive sensor 4 may be influenced by the presence or absence of fluid within the vertical tube 6 to detect a change in capacitance resulting from fluid between two opposing sensing pads 18. The number of sensing pads 18 may be contingent upon the vertical space available. It is expected, but not limited, that an appliance 19 would incorporate vertical sensing positions along the vertical tube 6 of full, ¾, ½, ¼, and empty corresponding to respective pairs of sensing pads 18. The position information for these sensing pads 18 is communicated via an interface 5 to an electronic control system for displaying the associated liquid level on an appliance control panel display screen. These indications will provide the user with an instant visual reservoir 15 fill status.

As illustrated in FIGS. 12 and 13, the check valves 12, 16 may be incorporated into the fluid passage 21, here one may be disposed on the inlet port 8 of the dosing pump head 2 and the other on the outlet port 20 of the reservoir 15, to prevent fluid spillage when the reservoir is removed. The check valve 12 on the inlet port 8 of the dosing pump head 2 will retain fluid 15 in the dosing pump 1, thus keeping the dosing pump 1 primed and ready for dispensing when the reservoir 15 is reinstalled. The two check valves 12, 16 may have mechanical features that interact with each other and the inlet port check valve spring 14 to open the respective check valves 12, 16 when the reservoir 15 is pushed into position, thus allowing the free flow of liquid through the fluid passage 21.

Figure 15:
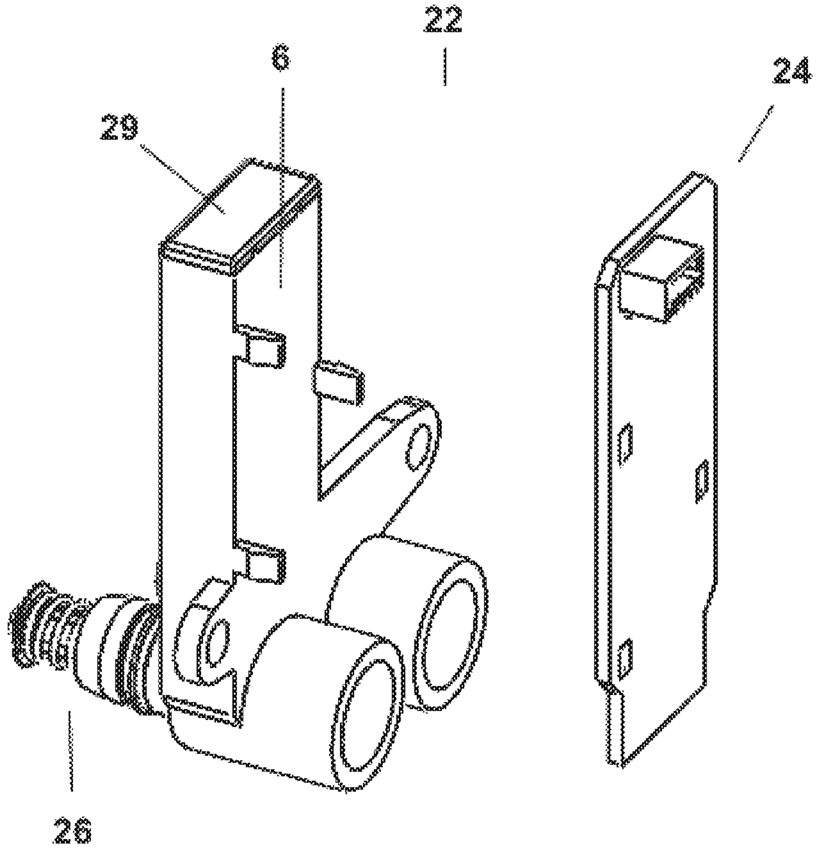
FIG. 15 is an exploded view of an intermediate liquid level sensing chamber with a rigid capacitive sensing printed circuit board and a vertical sensing tube and a vent cap and a check valve in accordance with an exemplary embodiment.
Figure 16:
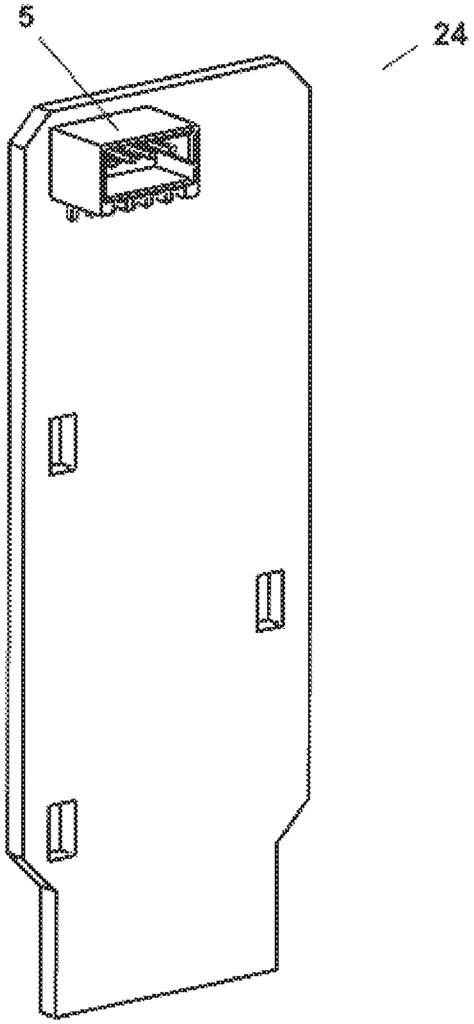
FIG. 16 is the connection side of the rigid printed circuit board with capacitive liquid level sensing in accordance with an exemplary embodiment.
Figure 17:
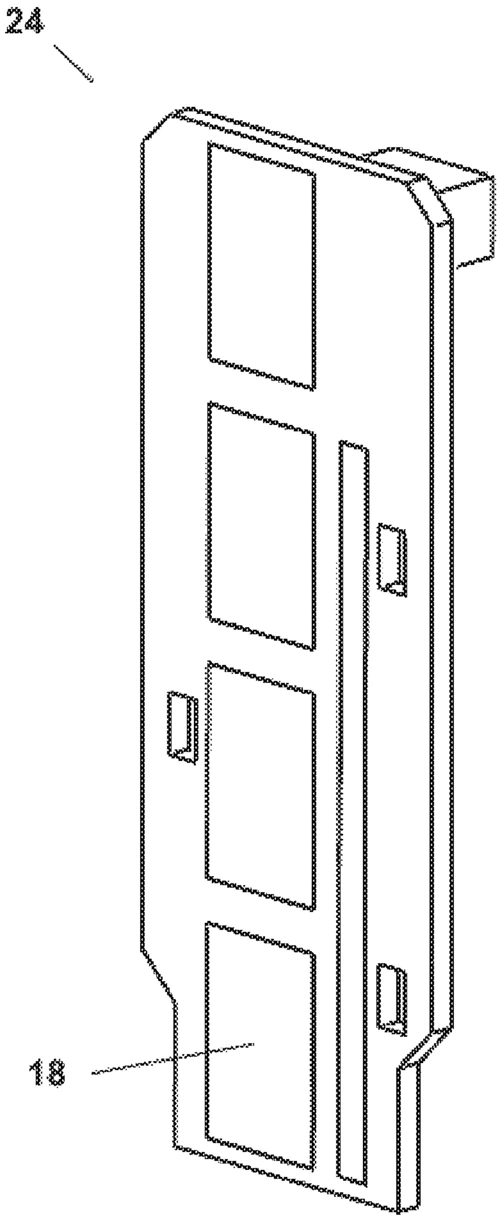
FIG. 17 is the capacitive liquid level sensing side of the rigid printed circuit board in accordance with an exemplary embodiment.

As shown in an alternate embodiment of FIGS. 14-17, particularly FIG. 15, the dosing pump 1 can include an intermediate liquid level sensing chamber 22 incorporating a vertical tube 6 having a rectangular profile configured for receiving a rigid printed circuit board 24, and covered by a rectangular vent cap 29. The vertical tube 6 in this embodiment includes prongs which are received within mating apertures of the rigid printed circuit board 24, enabling the board 24 to be snapped on.

As also shown in an alternate embodiment of FIGS. 14-17, a sensor array can be implemented as a rigid printed circuit board 24 instead of the flexible printed circuit board of the capacitance sensor 4 of the previous embodiment described hereinabove. The rigid printed circuit board 24 includes the interface 5 as described hereinabove and also includes a plurality of sensing pads 18 for detecting changes in capacitance corresponding to liquid level, as described hereinabove.

Figure 18:
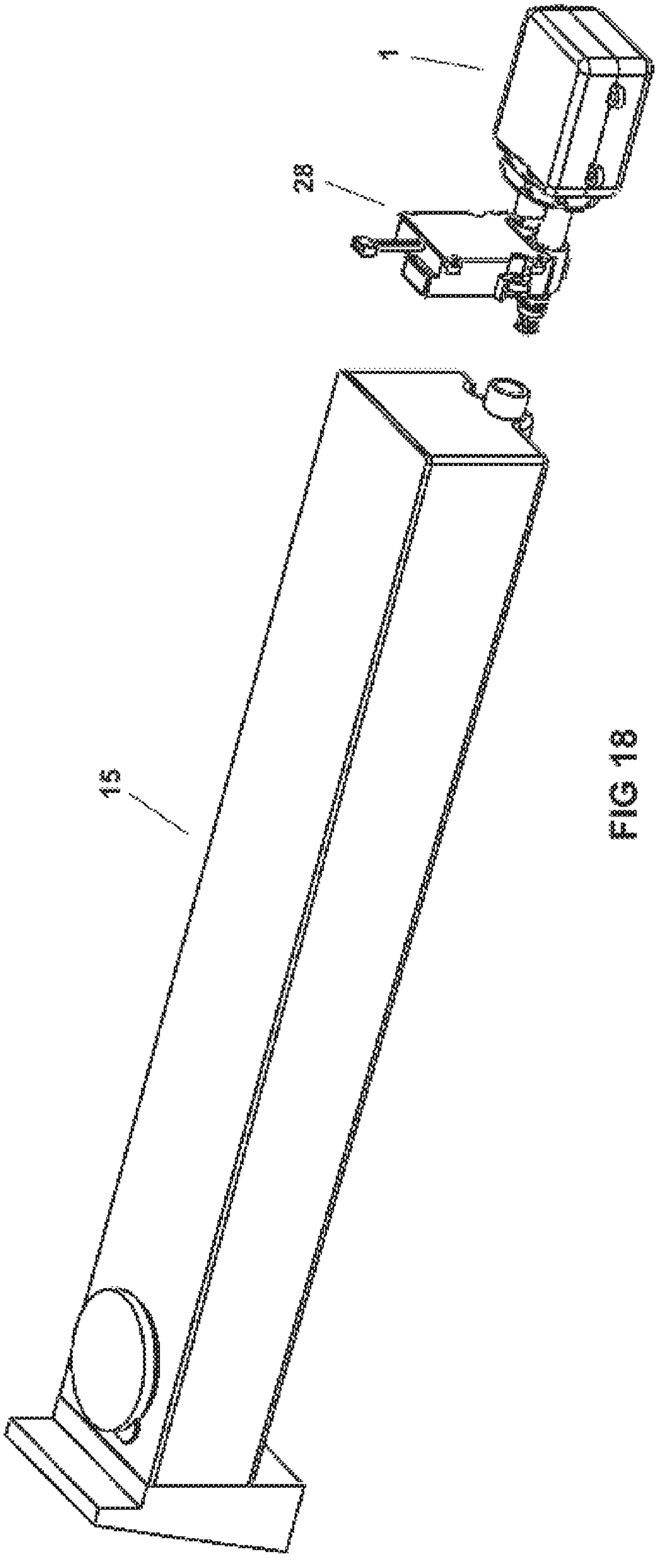
FIG. 18 is a rear perspective view of a reservoir connected to a dosing pump with an intermediate liquid level sensing chamber utilizing multiple magnet actuated reed switches to sense liquid level in accordance with an exemplary embodiment.
Figure 19:
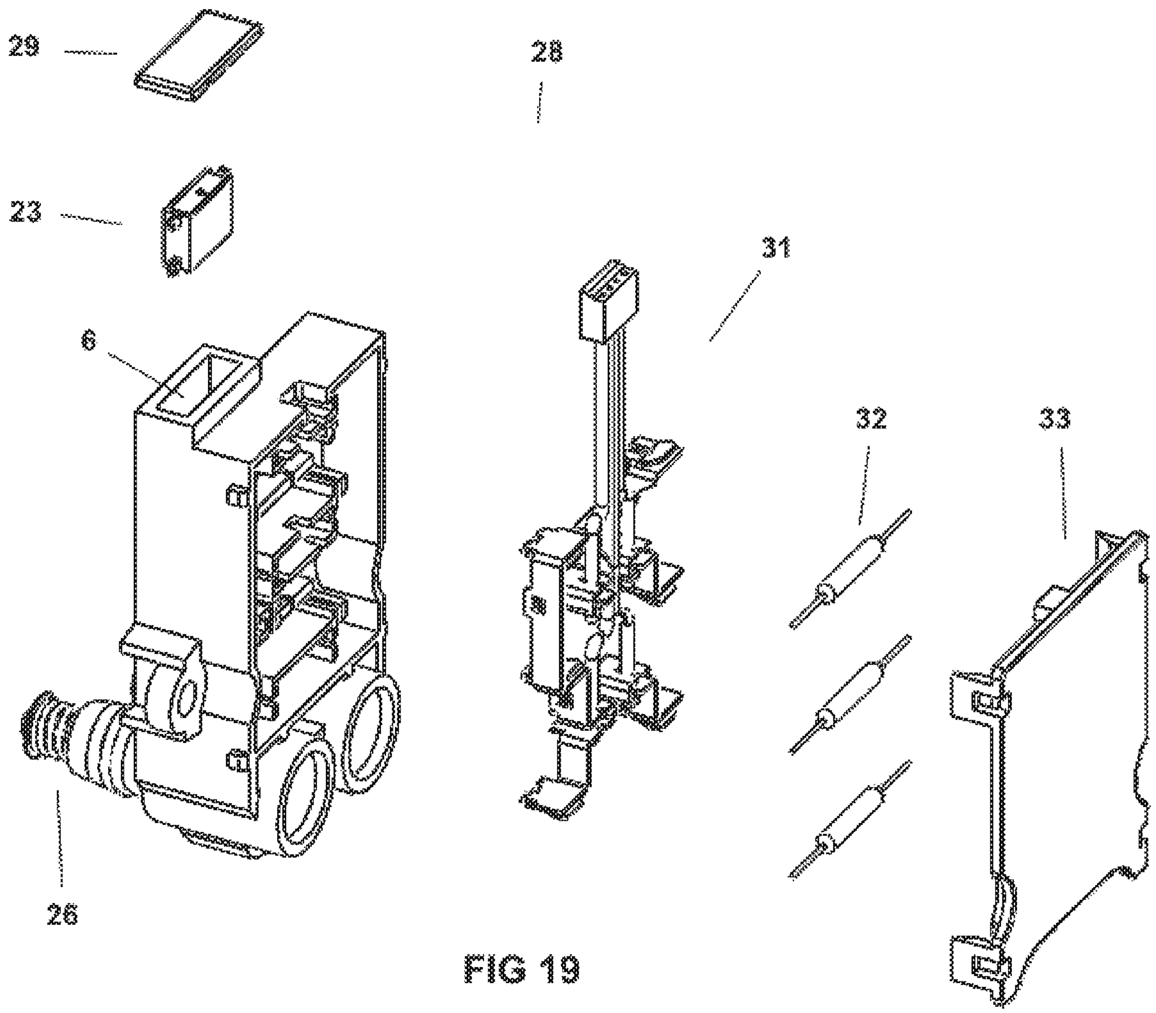
FIG. 19 is an exploded view of an alternate construction of an intermediate liquid level sensing chamber with multiple reed switches and a floating magnet and a vent cap and a check valve in accordance with an exemplary embodiment.

As also shown in a further alternate embodiment of FIGS. 18-19, a sensor array can be implemented as a plurality of reed switches 32 that are not based on capacitance sensing. Rather, the reed switches 32 turn on or off in response to the position of a floating magnet 23 which floats atop the liquid in a rectangular vertical tube 6 and thereby raises or lowers with the changing liquid level in the vertical tube 6.

With further reference to the further alternate embodiment of FIGS. 18-19, the plurality of reed switches 32 enables multiple fluid levels to be detected in the vertical tube 6, based on the variable position of the floating magnet 23. Since the vertical tube 6 and the reservoir 15 are at the same liquid level, the reed switches 32 can effectively communicate with the liquid level of the reservoir 15 to the appliance controller by generating an ON/OFF switch status signal.

With ongoing reference to the further alternate embodiment of FIGS. 18-19, three different liquid levels are indicated, indicating top, middle, and low levels as shown, though any suitable number could be employed within the scope of the invention. The floating magnet 23 will activate one reed switch 32 at a time in relation to the proximity of the magnet 23 to each switch 32 as the level changes. For example, for a full reservoir 15, the floating magnet 23 will activate the top reed switch 32. As the liquid level is depleted, the top switch will deactivate and the middle reed switch 32 will be activated by the floating magnet 23. When the liquid level approaches empty, the magnet 23 moves below the level of the low reed switch 32 which will then deactivate, and the controller will activate a light indicating an empty reservoir 15.

As also shown particularly in the further alternate embodiment of FIG. 19, the dosing pump 1 can include an intermediate liquid level sensing chamber 28 including the rectangular vertical tube 6 for retaining the floating magnet 23 and covered by the rectangular vent cap 29. The chamber 28 also encloses an electrical conducting structure 31 for supporting the three reed switches 32 and providing an electrical connection to the interface 5 and thereby enabling communication to the controller. The assembly 28 is enclosed with a cover 33.

As shown particularly in FIGS. 15 and 19, the alternate embodiments of the dosing pump 1 also include a check valve 26 in accordance with the check valve 12 of the pump sensor inlet port of the aforementioned embodiment, which engages the reservoir check valve 16. As shown in FIG. 18, the reservoir 15 is formed as a drawer and the check valve 26 closes when the reservoir drawer is pulled out for refilling. The reservoir check valve 16 prevents the reservoir 15 from draining out through the reservoir outlet port. The check valve 26 in the pump sensor inlet port keeps the pump from losing prime due to fluid backflowing out the inlet port, as described hereinabove.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A dosing pump assembly comprising:

a dosing pump head having an inlet port connected to a liquid reservoir, an outlet port for dispensing a predetermined dose of liquid from the reservoir, and a fluid passage between the inlet and outlet ports;

a vertical tube fluidly connected to the fluid passage and configured to indicate liquid level of the reservoir, the vertical tube having a vent cap having a vent hole to equalize pressure to atmosphere within the vertical tube; and a sensor array vertically affixed to the vertical tube, the sensor array comprising a plurality of sensors at a respective plurality of sensing positions along the vertical tube indicative of liquid level of the reservoir.

2. The dosing pump of claim 1, wherein the vertical tube is mounted parallel to a vertical height of the reservoir such that a level of liquid in the vertical tube corresponds to the liquid level of the reservoir.

3. The dosing pump of claim 1, wherein the sensor array comprises a capacitive sensor vertically affixed to the vertical tube, wherein the plurality of sensors of the capacitive sensor comprises a plurality of sensing pads at a respective plurality of sensing positions along the vertical tube indicative of liquid level of the reservoir.

4. The dosing pump of claim 3, wherein the capacitive sensor is constructed from a flexible printed circuit disposed on an exterior of the vertical tube and wherein the sensing pads further comprise pairs of sensing pads configured on opposing sides of the vertical tube.

5. The dosing pump of claim 4, wherein the capacitive sensor comprises five (5) pairs of sensing pads, disposed in locations vertically on the vertical tube which correspond to liquid sensing positions in the vertical tube of full, three-fourths (¾) full, half (½) full, one-fourth (¼) full, and empty.

6. The dosing pump of claim 4, wherein the capacitive sensor comprises an interface for communicating sensor output indicative of the liquid level of the reservoir to a display screen.

7. The dosing pump of claim 1, wherein the sensor array comprises a plurality of reed switches that turn on or off in response to a position of a floating magnet which floats atop liquid in the vertical tube and thereby raises or lowers with the changing liquid level in the vertical tube.

8. The dosing pump of claim 7, further comprising an intermediate liquid level sensing chamber for enclosing an electrical conducting structure for supporting the plurality of reed switches and an interface to an electrical controller.

9. The dosing pump of claim 1, wherein the inlet port comprises an inlet port check valve that matingly connects to a reservoir check valve on the reservoir, wherein the fluid passage is restricted from backflow and spillage by the check valves when the liquid reservoir is removed from the inlet port, thereby retaining liquid within the dosing pump in a primed condition.

10. The dosing pump of claim 9, wherein at least one of the inlet port check valve and the reservoir check valve comprise an O-ring seal.

11. The dosing pump of claim 9, wherein at least one of the inlet port check valve and the reservoir check valve comprise a check valve spring for biasing the check valve into engagement with the respective other check valve.

12. The dosing pump of claim 9, wherein the check valves are positioned at a lowest point of the reservoir to allow the vertical tube to sense a full vertical range of liquid level of the reservoir.

13. The dosing pump of claim 1, wherein the dosing pump head is connected to a motor within a motor housing for pumping liquid from the reservoir through the fluid channel to the outlet port.

14. A dosing pump assembly comprising:

a dosing pump head having an inlet port connected to a liquid reservoir, an outlet port for dispensing a predetermined dose of liquid from the reservoir, and a fluid passage between the inlet and outlet ports;

a vertical tube fluidly connected to the fluid passage and configured to indicate liquid level of the reservoir;

a plurality of reed switches that turn on or off in response to a position of a floating magnet which floats atop liquid in the vertical tube and thereby raises or lowers with the changing liquid level in the vertical tube;

wherein the inlet port comprises an inlet port check valve that matingly connects to a reservoir check valve on the reservoir; and wherein the fluid passage is restricted from backflow and spillage by the check valves when the liquid reservoir is removed from the inlet port, thereby retaining liquid within the dosing pump in a primed condition.

15. A dosing pump assembly comprising:

a dosing pump head having an inlet port connected to a liquid reservoir, an outlet port for dispensing a predetermined dose of liquid from the reservoir, and a fluid passage between the inlet and outlet ports;

a vertical tube fluidly connected to the fluid passage and configured to indicate liquid level of the reservoir;

a capacitive sensor vertically affixed to the vertical tube, the capacitive sensor comprising a plurality of pairs of sensing pads at a respective plurality of sensing positions along the vertical tube indicative of liquid level of the reservoir;

wherein the inlet port comprises an inlet port check valve that matingly connects to a reservoir check valve on the reservoir; and wherein the fluid passage is restricted from backflow and spillage by the check valves when the liquid reservoir is removed from the inlet port, thereby retaining liquid within the dosing pump in a primed condition.

* * * * *